J. G. P. THOMAS.
POWER TRANSMISSION.
APPLICATION FILED OCT. 11, 1913.

1,261,069.

Patented Apr. 2, 1918.
2 SHEETS—SHEET 1.

INVENTOR
John Godfrey Parry Thomas.
per
Attorney.

J. G. P. THOMAS.
POWER TRANSMISSION.
APPLICATION FILED OCT. 11, 1913.
1,261,069.
Patented Apr. 2, 1918.
2 SHEETS—SHEET 2.
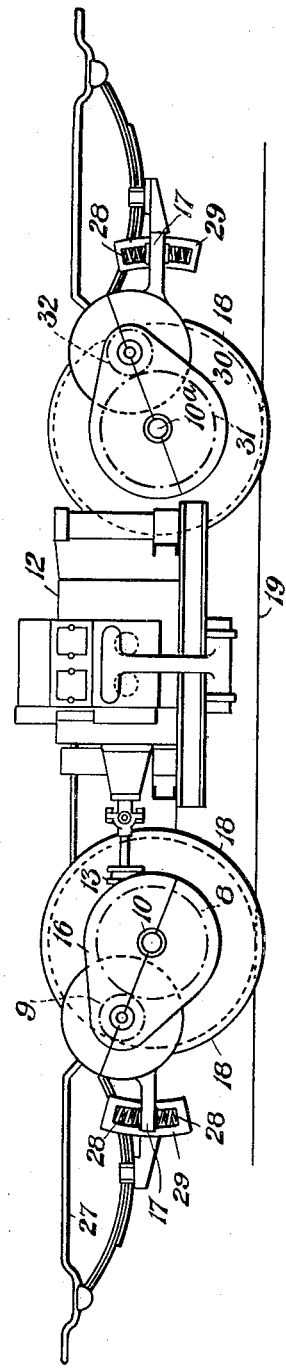
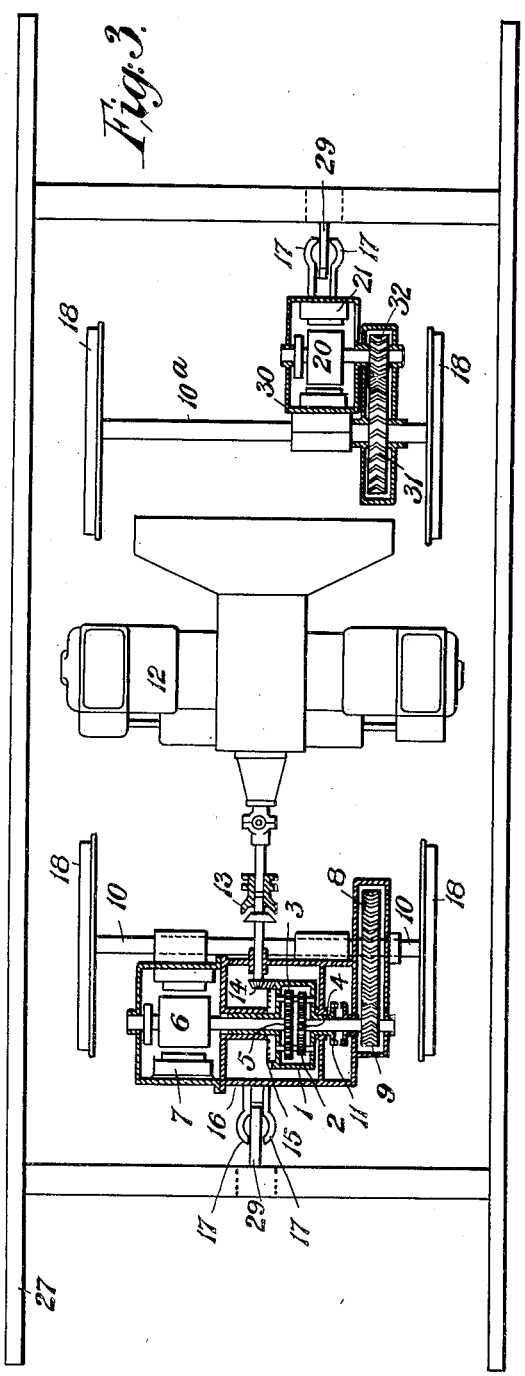
INVENTOR
John Godfrey Parry Thomas
per
Attorney.

UNITED STATES PATENT OFFICE.

JOHN GODFREY PARRY THOMAS, OF CHISWICK, LONDON, ENGLAND, ASSIGNOR TO THOMAS FOREIGN PATENTS LIMITED, OF KENSINGTON, LONDON, ENGLAND, A CORPORATION OF GREAT BRITAIN.

POWER TRANSMISSION.

1,261,069.  Specification of Letters Patent.  Patented Apr. 2, 1918.

Application filed October 11, 1913. Serial No. 794,671.

*To all whom it may concern:*

Be it known that I, JOHN GODFREY PARRY THOMAS, a subject of the King of Great Britain, residing at 21 Ennismore avenue, Chiswick, in the county of London, England, have invented new and useful Improvements in Power Transmissions, of which the following is a specification.

The present invention relates to the application of electromechanical power transmission systems to motor vehicles.

Various systems are already known of driving load shafts in which a prime motor commonly a petrol or similar internal combustion engine instead of driving the load directly through mechanical gearing is combined with dynamo electric machines through the medium of which its power is transmitted to the load shaft and the speed of the latter is regulated as desired. In particular there are electromechanical power transmission systems in which two dynamo electric machines, one of them mechanically connected to the load shaft, are inter-connected with each other, and the prime motor through an epicyclic or balance gearing. By way of example, a system of this kind invented by the present applicant is referred to hereinafter.

The invention forming the subject of the present application for Letters Patent is concerned not with any modification of such systems considered purely as transmission systems, but rather with their application to the driving of motor vehicles. It consists in the first place in an improved disposition upon the vehicle of the various machines or elements, constituting such systems; and in corresponding improvements in the arrangement of the necessary gearing. It consists further in the provision of means which enable the dynamo electric machines of the transmission system to function either as elements of that system or as independent electric motors, receiving their supply from a separate source; such means including independent control apparatus for controlling the said machines in their new function.

The invention is illustrated by the accompanying drawings, in which—

Fig. 2 shows in side elevation the main features of the mechanical disposition of the elements.

Fig. 3 is a plan of Fig. 2 showing the various gearings in section.

Figure 1:
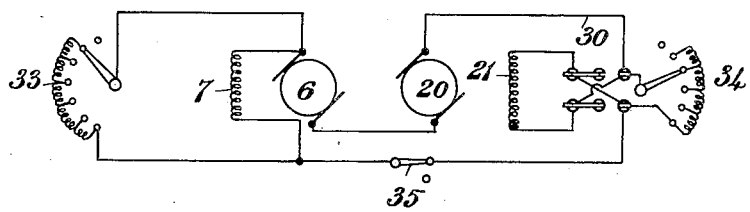
Figure 1 shows a diagram of connections of one of the known systems with which the invention deals, taken merely as an example.

It should be clearly understood that Fig. 1 exhibits no novelty forming part of the present invention. It is a diagram of electrical connections illustrating the operation of an electromechanical transmission system invented by the present applicant and fully described and illustrated in the specification and drawings of his United States Patent No. 948436, which system has been selected as an example of the systems with which the present invention is concerned.

In this system two dynamo electric machines 6, 7 and 20, 21 are connected together and to the prime driving motor by means of an epicyclic or balance gearing. The machine 20, 21 has its armature mechanically connected to the load shaft. One clutch serves for feeding the prime motor in the usual way, and another clutch, the members of which are connected with the armature shafts of the machines 6, 7, and 20, 21, enables the epicyclic gearing to be locked so that it rotates as a whole, forcing the prime motor and the two dynamo electric machines to rotate at the same speed. The machines 6, 7, and 20, 21 are electrically connected as shown in Fig. 1. The fields 7, 21, are, in one example illustrated in the prior patent, excited by current derived from the armatures 6, 20, as also shown in Fig. 1, the machines being series wound. Means are provided for varying the excitation of fields 7, 21, by the use of shunts 33, 34; the armatures 6, 20, are electrically connected, a switch 35 serving to break the connection. A further switch 36 serves for reversing the field 21. Hence by means of these switches arranged in practice in a controller the machines are enabled to go through the functions set out in detail in the specification of the previous patent.

When such a system as this has to be applied to a vehicle in such cases, for example, where the vehicle has a short wheel base, it is inconvenient to arrange the prime motor and the dynamo electric machines with their shafts in line as suggested in the prior specification above referred to. It is not desirable to mount the dynamo electric machines directly on the axles of the vehicle as has been proposed hitherto, because that involves too much dead weight upon the axles, and moreover dynamo electric machines cannot be designed conveniently to rotate at the comparatively low speeds of the axles of the vehicle.

In accordance with the present invention the desired economy of space and convenience of arrangement is secured by the adoption of a type of suspension similar to that used for the motors of road cars or tram cars or for motors employed in electric railway practice. Dynamo electric machines are set with their shafts parallel to the axles of the vehicle wheels, while the prime motor shaft may be either parallel or at right angles, whichever may be the more convenient in particular cases; and the casings of the electrical machines rest in part upon the vehicle axles and in part are borne upon springs, for example, by blocks, moving in arc-shaped guides. The epicyclic or differential gearing through which the machines have to be connected is arranged co-axially with one of the machines in its casing, and as the other machine is preferably located on the other axle and geared thereto by ordinary road car gearing the mechanical connection between the two machines is through the wheels and running surface. When both dynamo electric machines are thus geared to the axles of the vehicle they can, in case of need, be used to drive those axles directly, taking their supply from an overhead or other external conductor or a battery, instead of being driven from the prime motor carried upon the vehicle.

These novel features appear more particularly in Figs. 2 and 3 of the accompanying drawings, which will now be described in detail. A suitable prime motor such as an internal combustion engine 12 is mounted upon the vehicle. The engine 12 is connected through a clutch 13 and gearing hereinafter described with one axle 10 of the vehicle. Through the wheels 18 and track 19 therefore the prime motor is also in effect connected with the second axle 10ª of the vehicle, to which is geared a second dynamo electric machine 20, 21.

The balance gearing by which the two electrical machines 6, 7, and 20, 21 and the prime motor 12 are connected together, comprises a casing 1 forming the carrier for the spindles of planet wheels 2, 3, which mesh respectively with sun wheels 4, 5. Of these the latter is on the shaft of the dynamo electric machine 6, 7. The second dynamo electric machine 20, 21, having exactly the same function as that in the above mentioned specification, and shown in Fig. 1 is shown in Fig. 3 mounted upon the second axle 10ª of the vehicle. It is thus mechanically coupled with machine 6, 7, through the gearing 31, 32 of the road car or tram car type, the wheels of the vehicle, the track on which they run and the gearing 8, 9 by which the axle 10 is connected with the sun wheel 4. A clutch 11 indicated as a dog clutch but which instead may be any suitable friction clutch serves to put the epicyclic gearing out of action—in the arrangement shown this is effected by making fast the casing 1 or planet carrier to the larger sun wheel 4.

In the construction illustrated the prime motor 12 is shown as having its shaft at right angles to the axles 10, 10ª of the vehicle, and it drives the planet carrier 1 of the epicyclic gearing through a clutch 13 and bevel pinion 14, which latter meshes with bevel teeth 15 formed on the circumference of the casing or planet carrier. The gearing 14, 15 may be replaced by worm gearing. If desired, however, the prime motor 12 could be set with its shaft parallel to the vehicle rails, and could drive the planet carrier 1 through spur gearing or belts or chains.

The dynamo electric machine 6, 7, together with the balance gearing and the clutch 11 may conveniently be mounted together in a frame 16, which is in part slung from the axle 10 and in part carried by blocks 17 supported by springs 28 in arc-shaped guides 29 in a manner well known in electric rail and tramway practice. The frame 30 containing the second dynamo electric machine 20, 21 is similarly mounted with respect to the second axle 10ª, as seen to the right hand of Fig. 2.

It will be understood that when the vehicle is being driven by its own prime motor 12 the clutch 13 is put in and rendered operative and the clutch 11 is out of action except on top speed. The speed control is effected by electric control of the dynamo electric machines 6, 7, and 20, 21, as fully described in the specification of the prior patent mentioned above. For the purpose of this control the dynamo electric machines 6, 7, and 20, 21, are joined by conductors 22 to a suitable controller 23. In addition, however, to the rheostats and control apparatus necessary for this mode of running further provision may be made for running and controlling the dynamo electric machines like the two motors of a tram car by any of the systems commonly employed for such purposes.

Figure 4:
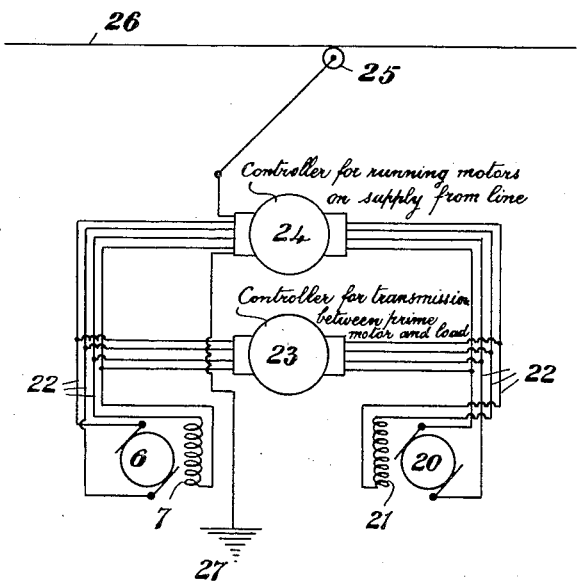
Fig. 4 is a diagram of the electrical connections employed.

When it is desired to drive the vehicle by aid of an overhead conductor the clutch 13 is put out of action and the engine 12 is stopped, while the clutch 11 is put in. The alternative system of control is brought into operation and the vehicle is then driven purely electrically. This alternative system of control comprises suitable controlling means 24 (Fig. 4), which is joined to the machines 6, 7, and 20, 21, and also through the trolley 25 to the overhead conductor 26 or other source of power, as well as being grounded by connection to the vehicle frame 27 and thus to the rails which commonly serve as the return conductor.

With the clutch 11 in the position illustrated in Fig. 3 it will be noted that when the clutch is engaged and the machine 6, 7, acting as a motor the axle 10 is driven through the balance gearing which is undesirable, especially if there is any back lash in the gearing. This difficulty, however, is readily avoided by introducing the clutch 11 between the planet carrier 1 and the shaft of the armature itself, in which position it serves equally well the function of locking the gear solid.

When it is unnecessary to drive two axles of the vehicle for the sake of utilizing the adhesion of four wheels both dynamo electric machines may be suspended from the same axle. The arrangement may be applied to bogie vehicles as well as to those with single axles.

What I claim is:

1. A motor vehicle comprising a frame, a prime motor carried thereby, two dynamo electric machines, wheels and axles, balance gearing interconnecting one of said dynamo electric machines with said prime motor and one axle, gearing connecting the other dynamo electric machine with another axle, a clutch for disengaging said prime motor from said machines, a separate electrical source of supply, means for controlling said dynamo electric machines as parts of an electromechanical transmission system and means for controlling said machines as motors connected with the separate source of supply.

2. A motor vehicle comprising a frame, wheels and axles, a prime motor upon said frame, dynamo electric machines, means for driving said wheels from said prime motor by the aid of said dynamo electric machines, controlling means for such drive, separate means for supplying electrical energy, means for disconnecting the prime motor from the wheels and dynamo electric machines, and means for connecting said dynamo electric machines to the separate source of supply and for controlling them when so connected.

3. In a motor vehicle the combination with one axle, of a dynamo electric machine, a balance gearing of the three-member type supported from said machine, and having one member connected thereto, means partially suspending said dynamo electric machine and a balance gear on said axle, a prime motor connected with another member of said balance gear, means connecting the third member of said balance gear with said axle, means for disconnecting said prime motor and means for directly gearing said dynamo electric machine to said axle.

4. In a motor vehicle the combination with one axle of a casing partly suspended therefrom, a dynamo electric machine in said casing, a balance gearing of the three-member type in said casing having one member connected to said dynamo electric machine, means for driving a second member, gearing connecting the third member with the axle, and means for locking the balance gearing.

5. A motor vehicle comprising a frame, axles and wheels, a prime motor upon said frame, dynamo electric machines hung from different axles, means for mechanically interconnecting said prime motor and said dynamo electric machines, and means for directly gearing said dynamo electric machines to said axles.

In testimony whereof I have signed my name to this specification in the presence of two subscribing witnesses.

JOHN GODFREY PARRY THOMAS.

Witnesses:
H. W. K. JENNINGS,
LEONARD E. HARPER.